Patented Jan. 17, 1939

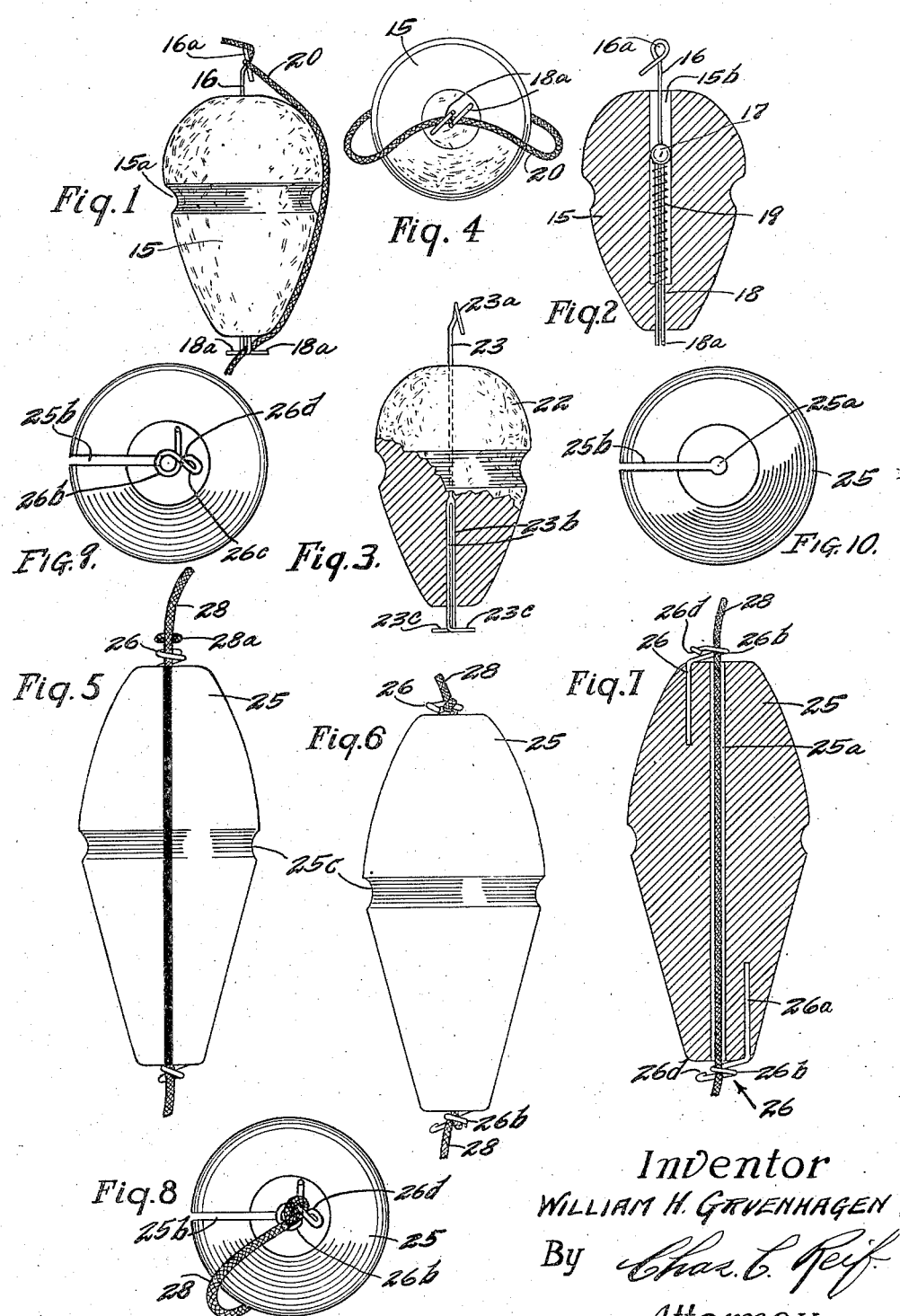

2,143,942

UNITED STATES PATENT OFFICE 2,143,942

FISHING FLOAT

William H. Gruenhagen, St. Paul, Minn.

Application May 21, 1936, Serial No. 80,974

4 Claims. (Cl. 43—49)

This invention relates to a fishing float or bobber such as is commonly used to support a fishing line and the bait-carrying means attached thereto.

It is an object of this invention to provide a fishing float of simple construction and one having a small rod or wire part at each end thereof adapted to hold the fishing line so that the float can be readily moved longitudinally of the line and so that it can be securely held thereon in different positions.

It is a further object of the invention to provide a fishing float comprising a body having a central bore or passage extending therethrough, through which a fishing line may freely pass and having means at the ends of said body for holding said line so that said float can be used either as a casting float or a float secured in fixed position.

It is a further object of the invention to provide a fishing float having a central bore or passage therein with an opening extending therefrom to the side of said float and means comprising loops at the ends of said float whereby a line may be disposed in said loops and passage and placed therein from the side of said float.

These and other objects and advantages of the invention will be fully set forth in the following description made in accordance with the accompanying drawing, in which like reference characters refer to similar parts throughout the several views in which:—

Fig. 1 is a view in side elevation of a float showing a fishing line attached thereto;

Fig. 2 is a central longitudinal vertical section through said float;

Fig. 3 is a view partly in side elevation and partly in longitudinal vertical section showing a modified form of float;

Fig. 4 is a bottom view of the float shown in Fig. 1;

Fig. 5 is a view in side elevation of a modified form of float showing a fishing line passing therethrough;

Fig. 6 is a view in side elevation taken at right angles to Fig. 5;

Fig. 7 is a central longitudinal vertical section of the float shown in Fig. 5 taken in a plane parallel to the drawing;

Fig. 8 is a bottom plan view of Fig. 6;

Fig. 9 is a top plan view of Fig. 5 with the fishing line omitted; and

Fig. 10 is a view similar to Fig. 9 with the line holding means omitted.

Referring to the drawing, in Fig. 1 a float is shown comprising a body 15 of circular form in transverse cross section, the upper end being rounded in approximately semi-spherical form and having a flat top. A groove 15a extends about the body 15 a short distance above the longitudinal center thereof and said body tapers downwardly from groove 15a and has a substantially flat bottom end. Body 15 will, of course, be made of some light material floatable in water, such as cork. The body 15 has a central or axial bore 15b extending downwardly therein from its top to a point a short distance from its bottom. A small rod or wire 16 extends centrally into bore 15b and is secured in a ball 17, preferably made of metal, which is movable longitudinally of bore 15b and substantially fits therein. The upper end of member 16 is reversely bent to form a substantially circular loop 16a, the terminal end of member 16 projecting at one side of loop 16a and being in contact with member 16 where it crosses the same. A pair of small rods or wires 18 extend downwardly from ball 17 being secured thereto and said members 18 project through the body 15 below bore 15b, said members having their terminal ends 18a bent substantially at right angles and in opposite directions. A coiled compression spring 19 surrounds member 18 within bore 15b, said spring engaging ball 17 at its upper end and engaging the bottom of bore 15b at its lower end.

In the use of the float shown in Figs. 1, 2, and 4, a fishing line 20 is disposed in loop 16a, and can be readily entered therein by passing the line beneath the terminal portion of member 16 and between it and the main portion of member 16. The line is then extended along one side of the float and placed between members 18. The terminal ends 18a are normally held against the bottom of the float by the action of spring 19. When the line is to be passed between members 18, the operator pushes down on loop 16a compressing spring 19 and moving members 18a away from the bottom of the float as illustrated in Figs. 1 and 2. After the line is placed between said members, loop 16a is released and the spring moves members 18a upwardly and they clamp the line against the bottom of the float. The float can be moved along the line and adjusted to different positions thereon by merely pressing down on the loop 16a and drawing the line through said loop and through the space between members 18.

In the modification shown in Fig. 3 a float having a body 22 of cork or similar light substance is shown. The member 22 is of similar shape to the member 15. The bore 15b however, is omitted and a small rod or wire 23 passes longitudinally and axially through member 22 being frictionally movable therein. Member 23 has a loop 23a at its upper end similar to the loop 16a. Member 23 also has a pair of members 23b at its lower end extending through member 22 and having their terminal portions 23c bent substantially at right angles and in opposite directions.

In operation the fishing line will be placed through loop 23a as already explained for loop 16a and it will then be carried along the side of the float and placed between members 23b. Portions 23c can be spaced from the bottom of member 22 by pushing downwardly on loop 23a. When the line is between members 23b, member 23 can be pulled upwardly and the line will then be held against the bottom of the float by members 23c. Obviously the float can be moved along the line by pushing down on member 23 and drawing the line through the portions thereof.

In Figs. 5 to 10 another float is shown comprising a body 25 which will be made of cork or some material readily floatable in water. Body 25 has a central longitudinal bore 25a extending axially therethrough and a slot 25b of less width than the diameter of said bore extends from said bore to one side of member 25 throughout the length thereof. Body 25 has a groove 25c extending thereabout adjacent its mid-portion and tapers toward each end from said groove, the same having flat ends. Member 25 is shown as circular in transverse cross section. At each end of member 25 is a member 26 made of a small rod or wire. Member 26 has a portion 26a forced into member 25 and extending longitudinally thereof at one side of bore 25a. Member 26 is thus rigidly secured to member 25. Member 26 is formed into a substantially circular loop 26b which is coaxial with bore 25a. A portion 26c extends from loop 26b and is reversely bent to have its terminal portion 26d disposed thereunder or between member 26c and the ends of member 25.

The float shown in Figs. 5 to 9 can be used either as a casting float or bobber to slide on the line or it can be fixed in place on the line. The float can be placed at any point on the line without threading the ends of the line therethrough. To do this, the line 28 is passed into the slot 25b and the line then moved under portion 26c. The line will then extend through the loop 26c and through the bore 25a so that the float is freely movable on the line. When so used, a knot 28a is usually formed in or on the line so that it will engage the outer side of loop 26b and prevent further passage of the line through the float. The bait and sinker used at the other end of the line will move the line through the float until knot 28a engages loop 26b. If it is desired to secure the float in fixed position on the line, the line is merely given a turn under portion 26c as shown in Fig. 8. The line is clamped between arm 26c and the end of the body 25 and is then held in place. Even if the line is not so clamped the float will be held in position thereon when the line extends around arm 26c, especially when the line is so disposed in each member 26. By having terminal part 26d beneath arm 26c or between arm 26c and the end of body 25, there is no projecting end which would be apt to catch on the clothing or person. The float can obviously be quickly detached from the line by merely reversing the operation and passing the line from under portion 26c and out at the slot 25b.

From the above description it is seen that applicant has invented a very simple and efficient structure of float and one that can be very quickly and easily placed on and secured on a fishing line. As stated, the float shown in Figs. 5 to 9 can be used either as a casting bobber slidable on the line or can be secured at any point thereon. The structure is exceedingly simple and is also quite rugged and durable. The devices have been amply demonstrated in actual practice, and have been found to be very successful and efficient. The same are being commercially made.

It will, of course, be understood that various changes may be made in the form, details, arrangement and proportions of the device without departing from the scope of applicant's invention, which, generally stated, consists in a device capable of carrying out the objects above set forth, such as disclosed and defined in the appended claims.

What is claimed is:—

1. A fishing float comprising a body of material floatable in water, a small rod passing longitudinally and substantially axially through said body, said rod having a loop formed at one end of said body through which a fishing line may pass and having a pair of movable ends at the other end of said body, said ends being bent substantially at right angles to extend in opposite directions whereby a fishing line may be disposed between said ends and between both of said bent portions and the end of said body.

2. The structure set forth in claim 1, said body having a bore extending thereinto at said first mentioned end and resilient means disposed in said bore urging said laterally bent portions against the end of said body to hold a line thereagainst.

3. A float comprising a body of material floatable in water, a small rod portion at each end of said body, one portion being reversely bent to form a loop with engaging sides into which a fishing line may be entered by passing the same between said engaging sides and the portion at the other end of said body having spaced parallel parts forming a passage therebetween for said line, said parts having bent ends projecting in opposite directions each being adapted to clamp said line against the end of said body.

4. The structure set forth in claim 1, said rod being mounted in said body for sliding movement longitudinally of said body whereby said bent ends of said rod may be moved away from said body for the insertion of said fishing line and may then be moved against said body for holding said line.

WILLIAM H. GRUENHAGEN.